United States Patent
Nakamura

(10) Patent No.: US 10,914,189 B2
(45) Date of Patent: Feb. 9, 2021

(54) TURBOCHARGER

(71) Applicant: TOYOTA JIDOSHA KABUSHIKI KAISHA, Toyota (JP)

(72) Inventor: Naoto Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 15/894,207

(22) Filed: Feb. 12, 2018

(65) Prior Publication Data

US 2018/0230847 A1    Aug. 16, 2018

(30) Foreign Application Priority Data

Feb. 14, 2017    (JP) .................................. 2017-025053

(51) Int. Cl.
*F01D 17/10*    (2006.01)
*F01D 15/08*    (2006.01)
*F02B 37/18*    (2006.01)

(52) U.S. Cl.
CPC ........... *F01D 17/105* (2013.01); *F01D 15/08* (2013.01); *F02B 37/186* (2013.01); *F05D 2220/40* (2013.01); *F05D 2260/606* (2013.01)

(58) Field of Classification Search
CPC ........ F16K 1/20; F16K 1/2014; F02B 37/186; F01D 17/105; F01D 15/08; F05D 2220/40; F05D 2260/606
See application file for complete search history.

(56) References Cited

U.S. PATENT DOCUMENTS 10,605,115 B2 *   3/2020   Iwata .................... F02B 37/183
10,851,730 B2 *  12/2020   Matsumoto ............ F02B 39/16
2014/0345273 A1  11/2014   Yamaguchi et al.
2018/0010513 A1 *  1/2018   Lim ....................... F02B 37/186
2019/0003376 A1 *  1/2019   Schawer ................ F16C 27/02

FOREIGN PATENT DOCUMENTS

| DE | 10 2012 202 505 A1 | 8/2013 | |
| EP | 3199778 A1 * | 8/2017 | .............. F02B 37/18 |
| GB | 2530824 A * | 4/2016 | ............ F02B 37/186 |
| JP | 2-56812 * | 4/1990 | |
| JP | 2-56812 U | 4/1990 | |
| JP | 2012-67698 | 4/2012 | |
| JP | 2013-2431 | 1/2013 | |
| JP | 5995989 | 9/2016 | |
| JP | 2016-205252 A | 12/2016 | |

OTHER PUBLICATIONS

Partial English translation only of Japanese Office Action dated Jun. 11, 2019, in Patent Application No. 2017-025053, 3 pages.

* cited by examiner

*Primary Examiner* — Eldon T Brockman
*Assistant Examiner* — Topaz L. Elliott
(74) *Attorney, Agent, or Firm* — Oblon, McClelland, Maier & Neustadt, L.L.P.

(57) ABSTRACT

A turbocharger includes a turbine wheel, a turbine housing including a waste gate port allowing exhaust gas to flow by bypassing the turbine wheel, and a waste gate valve configured to open and close the waste gate port. The waste gate valve is configured such that a valve body including a valve plate configured to close the waste gate port by abutting against the turbine housing and a valve stem is tilted with respect to a swing arm. A stopper abutting against the valve body when an abutting surface of the valve plate is apart from the turbine housing and the waste gate port is in an open state is disposed in the turbine housing.

7 Claims, 6 Drawing Sheets

TURBOCHARGER

INCORPORATION BY REFERENCE

The disclosure of Japanese Patent Application No. 2017-025053 filed on Feb. 14, 2017 including the specification, drawings and abstract is incorporated herein by reference in its entirety.

BACKGROUND

1. Technical Field

The present disclosure relates to a turbocharger provided with a waste gate valve.

2. Description of Related Art

Japanese Unexamined Patent Application Publication No. 2012-67698 (JP 2012-67698 A) discloses a turbocharger provided with a waste gate valve configured to open and close a waste gate port disposed in a turbine housing when a swing arm supporting a valve body rotates as a result of rotation of a shaft passing through the turbine housing.

In the waste gate valve disclosed in JP 2012-67698 A, the valve body is attached to the swing arm via an elastic member and the valve body can be tilted with respect to the swing arm.

SUMMARY

In the waste gate valve in which the valve body is mounted on and can be tilted with respect to the swing arm, exhaust gas blown out from the waste gate port collides with the valve body and the valve body vibrates when the valve body is apart from the turbine housing and the waste gate port is in an open state, that is, when the waste gate valve is in an open state. The vibration results in noise generation or wearing of a sliding part.

In a case where the valve body is attached to the swing arm via the elastic member as in the waste gate valve disclosed in JP 2012-67698 A, the vibration is reduced by the biasing force of the elastic member. However, the elastic member is subjected to fatigue and weakening as the vibration continues to be input to the elastic member.

An aspect of the present disclosure relates to a turbocharger including a turbine wheel, a turbine housing including a waste gate port allowing exhaust gas to flow by bypassing the turbine wheel, a waste gate valve configured to open and close the waste gate port, and a stopper. In the turbocharger, the waste gate valve includes a valve body, a swing arm, and a support plate. The valve body includes a valve plate and a valve stem. The valve plate is configured to close the waste gate port by abutting against the turbine housing. The valve stem is disposed on a back surface of the valve plate on a side opposite to an abutting surface of the valve plate configured to close the waste gate port. The swing arm includes a shaft and an arm portion. The shaft is supported to rotate with respect to the turbine housing. The arm portion is formed with an insertion hole into which the valve stem is inserted. The support plate is fixed to a part of the valve stem protruding from the insertion hole. The arm portion is sandwiched between the support plate and the valve plate and configured such that the valve body tilts with respect to the arm portion. The stopper is disposed in the turbine housing, and is configured to abut against the valve body when the abutting surface of the valve plate is apart from the turbine housing and the waste gate port is in an open state.

According to the aspect of the present disclosure, a movement of the valve body is regulated by the valve body abutting against the stopper when the waste gate port is open, that is, when the waste gate valve is open. As a result, vibration of the valve body attributable to a collision of the exhaust gas can be suppressed.

In the turbocharger according to the aspect of the present disclosure, a tip of the part of the valve stem of the valve body protruding from the insertion hole may be a flat surface and the stopper may have a flat contact surface in surface contact with the tip of the valve stem of the valve body.

According to the aspect of the present disclosure, the contact surface of the stopper and the tip of the valve stem are in surface contact with each other. When the contact surface of the stopper and the tip of the valve stem are in surface contact with each other, the valve stem is unlikely to tilt with respect to the contact surface. Accordingly, vibration causing the valve body to tilt is unlikely to occur.

In the turbocharger according to the aspect of the present disclosure, the stopper and the valve body may include engaging portions engaged with each other when the stopper and the valve body abut against each other and the engaging portions may be configured to regulate rotation of the valve body using the valve stem inserted into the insertion hole as a rotary shaft.

According to the aspect of the present disclosure, rotation of the valve body with respect to the arm portion can also be regulated when the valve body abuts against the stopper, and thus wear of the valve stem attributable to rotation can be suppressed as well.

In the turbocharger according to the aspect of the present disclosure, a part of a peripheral edge of the support plate may be a linearly extending planar portion, the stopper may include an engaging projecting portion engaged with the planar portion when the valve body abuts against the stopper, and the planar portion disposed in the support plate and the engaging projecting portion disposed in the stopper may constitute the engaging portion.

According to the aspect of the present disclosure, rotation of the valve body is regulated by the planar portion of the support plate and the flat surface of the engaging projecting portion abutting against each other.

In the turbocharger according to the aspect of the present disclosure, an elastic member may be sandwiched in at least one of between the valve plate and the arm portion and between the arm portion and the support plate.

According to the aspect of the present disclosure, vibration of the valve body can be reduced by the valve body being biased by the restoring force of the elastic member. Especially, the vibration of the valve body in a state where the abutting surface of the valve plate is apart from the turbine housing and the valve body does not abut against the stopper can be reduced. Vibration of the valve body can be suppressed by the valve body abutting against the stopper and vibration input to the elastic member can be suppressed, and thus the fatigue and weakening of the elastic member can be suppressed.

In the turbocharger according to the aspect of the present disclosure, the elastic member may be a disk spring sandwiched between the support plate and the valve plate along with the arm portion with the valve stem inserted into the disk spring. According to the aspect of the present disclosure, vibration of the valve body can be reduced in any direction of the perimeter of the valve stem by the valve body being biased by the disk spring over the entire circumference of the perimeter of the valve stem.

In the turbocharger according to the aspect of the present disclosure, the stopper may be integrated with the turbine housing. According to the aspect of the present disclosure, no additional component needs to be prepared to form the stopper. Accordingly, an increase in the number of components can be suppressed. Integrally casting the stopper in the turbine housing by casting, cutting the stopper in the turbine housing by cutting, or the like is conceivable as a method by which the stopper is formed integrally with the turbine housing.

In the turbocharger according to the aspect of the present disclosure, the stopper may be disposed such that a straight line passing through the waste gate port and the stopper passes through the valve plate at any opening degree of the waste gate valve.

When the stopper is disposed at a position with which the exhaust gas blown out from the waste gate port directly collides, disturbance arises in the flow of the exhaust gas due to the collision with the stopper. According to the aspect of the present disclosure, in contrast, the space between the waste gate port and the stopper is shielded by the valve plate at any opening degree of the waste gate valve. In other words, when the stopper is disposed at the above-described position, the exhaust gas blown out from the waste gate port directly collides with the valve plate as in a case where the stopper is not disposed, and the exhaust gas blown out from the waste gate port does not directly collide with the stopper even when the stopper is disposed. Accordingly, disturbance of the flow of the exhaust gas attributable to the disposition of the stopper can be suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
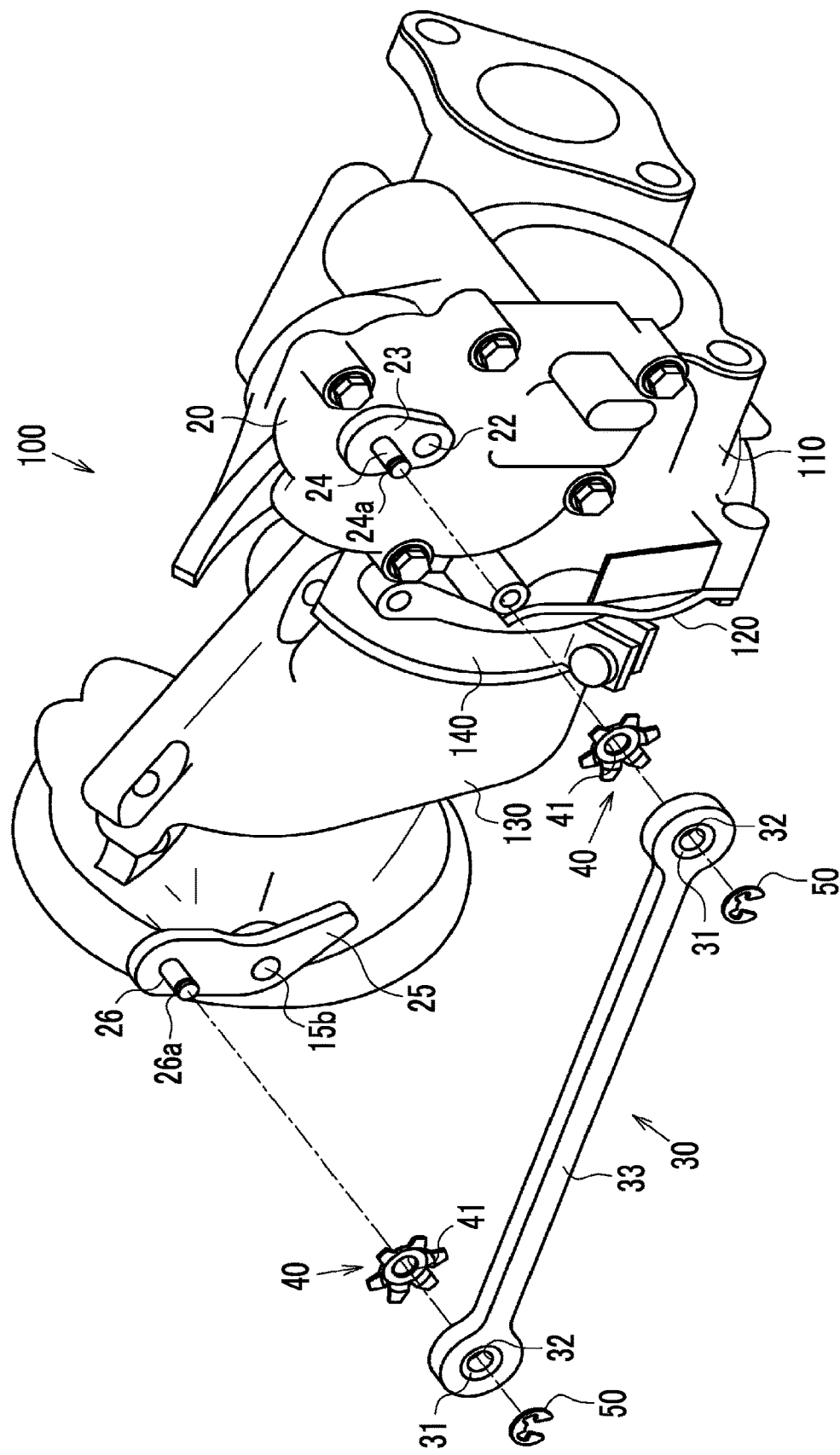
FIG. 1 is a perspective view of a turbocharger.

Hereinafter, an embodiment of a turbocharger will be described with reference to FIGS. 1 to 9. As illustrated in FIG. 1, a turbocharger 100 is configured as a combination of a compressor housing 110, a bearing housing 120, and a turbine housing 130. The compressor housing 110 is a housing accommodating a compressor wheel. The turbine housing 130 is a housing accommodating a turbine wheel. The bearing housing 120 is a housing supporting a connecting shaft connecting the compressor wheel and the turbine wheel to each other.

The bearing housing 120 is fastened to the compressor housing 110 by a bolt. The turbine housing 130 is assembled to the bearing housing 120 by a clamp 140.

Figure 2:
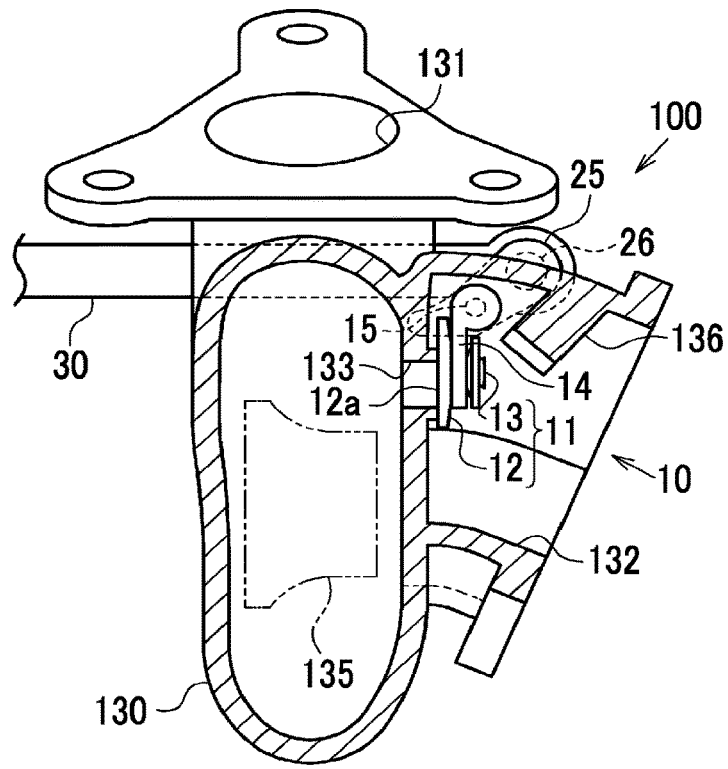
FIG. 2 is a partial sectional view of a turbine housing.

As illustrated in FIG. 2, a turbine wheel 135 is accommodated in the turbine housing 130 and a scroll passage 131 extending to surround the turbine wheel 135 is formed in the turbine housing 130. Exhaust gas blown to the turbine wheel 135 through the scroll passage 131 is discharged from the turbine housing 130 to an exhaust passage through a discharge passage 132.

In the turbocharger 100, the turbine wheel 135 is rotated by the exhaust gas passing through the scroll passage 131 being blown to the turbine wheel 135. When the turbine wheel 135 rotates, the compressor wheel connected to the turbine wheel 135 via the connecting shaft rotates. As a result, turbocharging of intake air is performed.

As illustrated in FIG. 2, a waste gate port 133 is disposed in the turbine housing 130. The waste gate port 133 is a passage connecting the scroll passage 131 and the discharge passage 132 to each other by bypassing the turbine wheel 135.

A waste gate valve 10 is disposed in the turbocharger 100. The waste gate valve 10 has a disk-shaped valve plate 12 blocking the waste gate port 133 and opens and closes the waste gate port 133 by rotating about a shaft 15 rotatably supported by the turbine housing 130.

Figure 3:
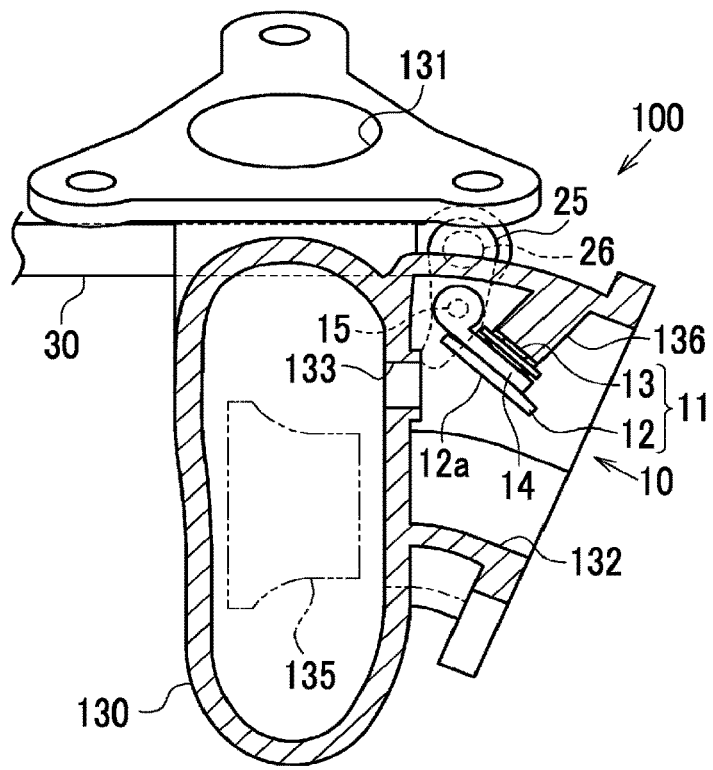
FIG. 3 is a partial sectional view of the turbine housing.

As illustrated in FIG. 3, the exhaust gas passing through the scroll passage 131 flows into the discharge passage 132 through the waste gate port 133 when an abutting surface 12a of the valve plate 12 is apart from the waste gate port 133 and the waste gate port 133 is open, that is, when the waste gate valve 10 is open. The amount of the exhaust gas blown to the turbine wheel 135 decreases when the exhaust gas passing through the scroll passage 131 flows into the discharge passage 132 through the waste gate port 133 as described above. Accordingly, in a case where the waste gate valve 10 is open, the rotation of the turbine wheel 135 and the compressor wheel is suppressed and the turbocharging is suppressed.

A stopper 136 defining a fully open position of the waste gate valve 10 by abutting against the waste gate valve 10 is disposed in the turbine housing 130. The configuration of the stopper 136 will be described in detail later.

Figure 4:
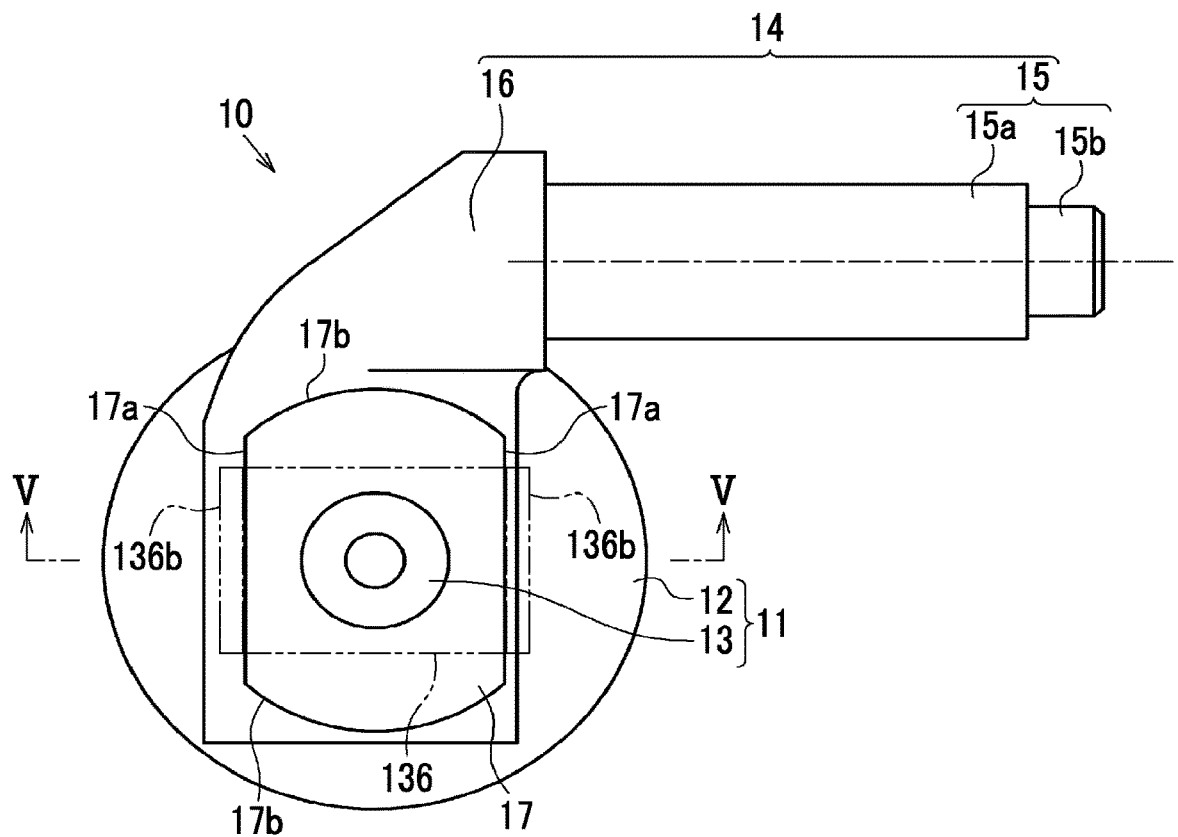
FIG. 4 is a top view of a waste gate valve.

The configuration of the waste gate valve 10 will be described in detail with reference to FIGS. 4 to 7. As illustrated in FIG. 4, the waste gate valve 10 is obtained by a valve body 11 being assembled to a swing arm 14 provided with the shaft 15. The valve body 11 is assembled to an arm portion 16 of the swing arm 14.

The arm portion 16 connected to the shaft 15 is curved, and the part of the arm portion 16 that is on the side opposite to its part connected to the shaft 15 has a plate shape. The valve body 11 is supported by the plate-shaped part, and the plate-shaped part supporting the valve body 11 is apart from the central axis of the shaft 15 in the direction that is orthogonal to the central axis.

A large-diameter portion 15a and a small-diameter portion 15b constitute the shaft 15. The large-diameter portion 15a is connected to the arm portion 16. The small-diameter portion 15b is smaller in diameter than the large-diameter portion 15a. The large-diameter portion 15a and the small-diameter portion 15b are connected such that their central axes correspond to each other.

Figure 5:
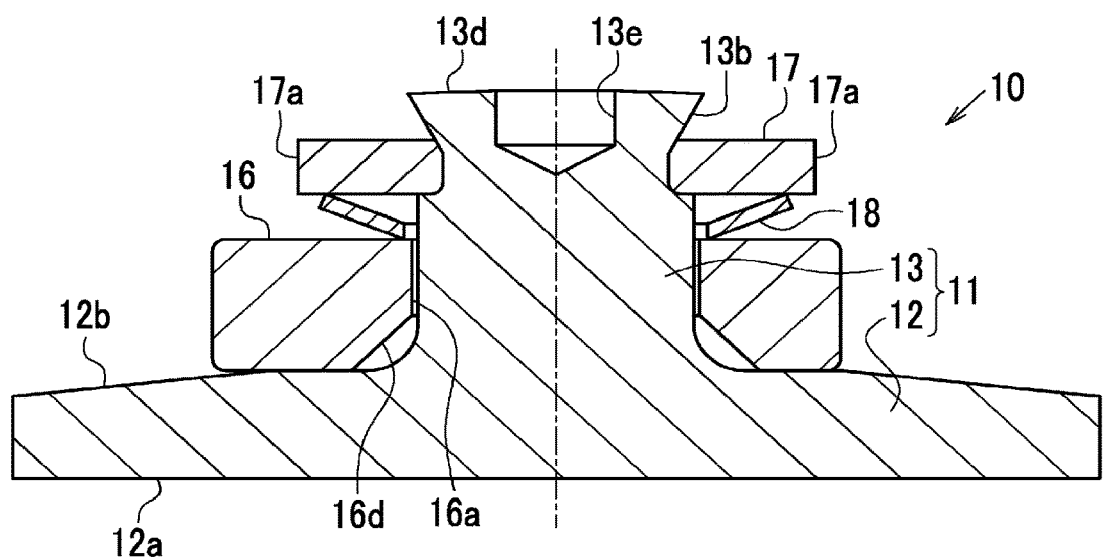
FIG. 5 is a cross-sectional view taken along line arrow V-V of FIG. 4.

As illustrated in FIG. 5, the valve body 11 is fixed to the arm portion 16 in a state where a valve stem 13 is inserted into an insertion hole 16a disposed in the arm portion 16. The valve stem 13 extends vertically with respect to the valve plate 12 from a back surface 12b on the side opposite to the abutting surface 12a of the valve plate 12. The valve stem 13 is disposed at the center of the valve plate 12.

A plate-shaped support plate 17 is fixed to the part of the valve stem 13 that protrudes from the insertion hole 16a in the arm portion 16. The support plate 17 is larger in diameter than the insertion hole 16a, and thus the valve body 11 is retained such that the valve stem 13 does not escape from the insertion hole 16a by the support plate 17 being fixed as described above.

As illustrated in FIG. 4, two parallel planar portions 17a and two curved surface portions 17b constitute the peripheral edge of the support plate 17. Each of the planar portions 17a linearly extends, and the curved surface portions 17b connect the planar portions 17a to each other. The curved surface portions 17b are arc-shaped and curved surfaces convex toward the outside of the support plate 17.

As illustrated in FIG. 5, a disk spring 18 is sandwiched between the arm portion 16 and the support plate 17. The valve stem 13 is inserted into the disk spring 18, and the disk spring 18 is sandwiched in a state where it is compressed between the support plate 17 and the valve plate 12 along with the arm portion 16. As a result, the arm portion 16 is in a state where it is pressed against the back surface 12b of the valve plate 12 by the restoring force of the disk spring 18.

Figure 6:
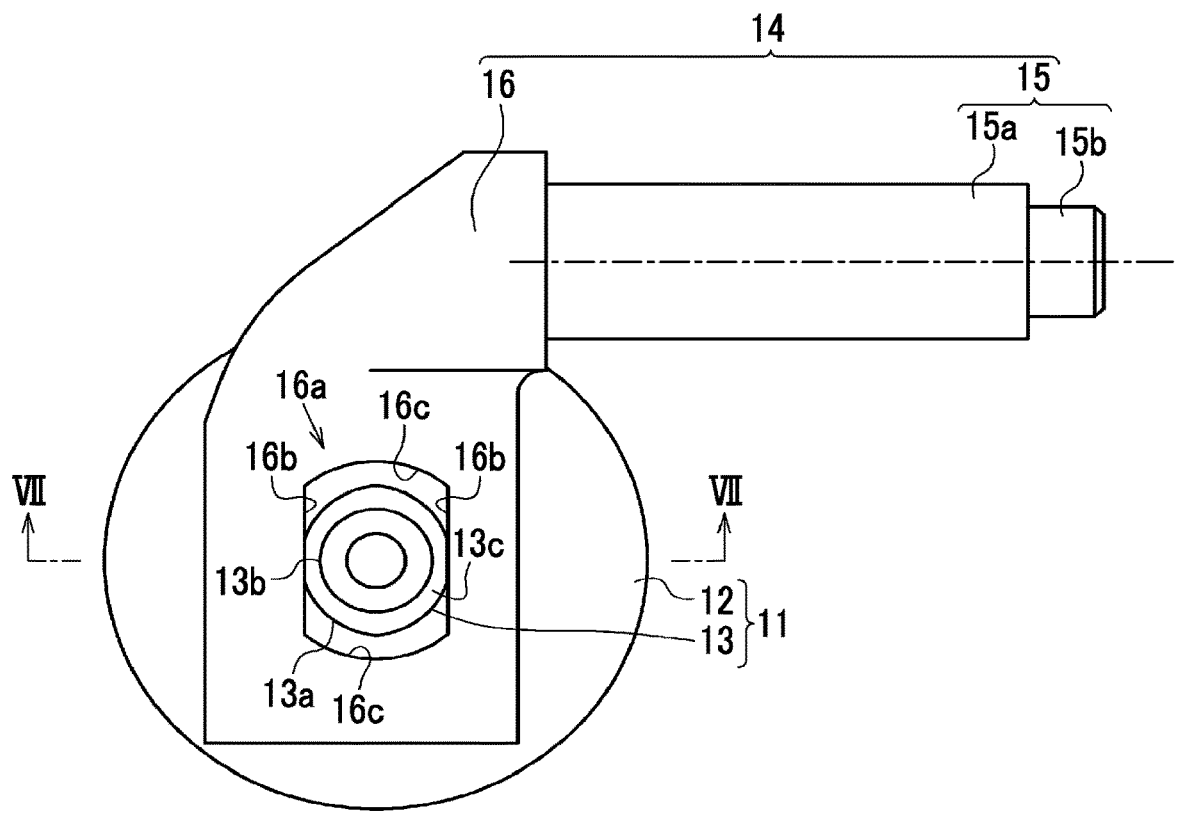
FIG. 6 is a top view of a swing arm in a state where a valve stem is inserted.
Figure 7:
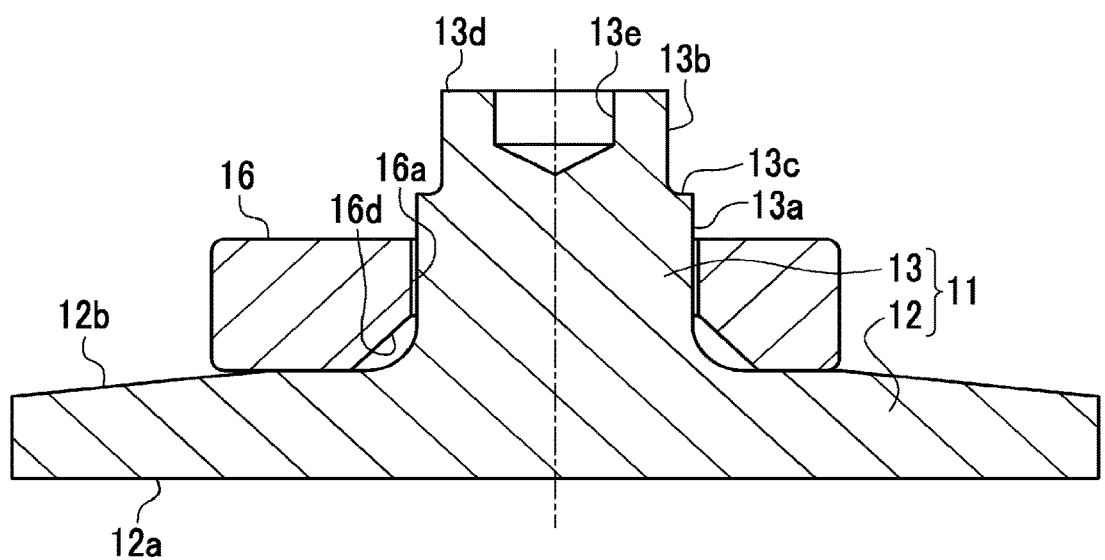
FIG. 7 is a cross-sectional view taken along line arrow VII-VII of FIG. 6.

As illustrated in FIG. 6, two parallel planar portions 16b and two curved surface portions 16c constitute the inner peripheral surface of the insertion hole 16a. The planar portions 16b extend in the direction that is orthogonal to the central axis of the shaft 15, and the curved surface portions 16c connect the planar portions 16b to each other. The curved surface portions 16c are arc-shaped and curved surfaces convex toward the radial-direction outside of the insertion hole 16a. In FIGS. 6 and 7, the valve body 11 and the swing arm 14 to which the disk spring 18 and the support plate 17 are yet to be attached are illustrated.

In the insertion hole 16a, the length of each of the planar portions 16b in the direction parallel to the abutting surface 12a of the valve plate 12 is longer than the gap between the two planar portions 16b. In other words, the insertion hole 16a in the arm portion 16 is a long hole and its longitudinal direction is the direction that is parallel to the abutting surface 12a of the valve plate 12 and orthogonal to the central axis of the shaft 15.

As illustrated in FIG. 7, the part of the insertion hole 16a that is on the valve plate 12 side is a tapered surface 16d inclined such that its part closer to the valve plate 12 has a larger inner diameter. As illustrated in FIGS. 6 and 7, the valve stem 13 is shaped such that a large-diameter portion 13a extending from the back surface 12b of the valve plate 12 and a small-diameter portion 13b smaller in diameter than the large-diameter portion 13a are coaxially connected to each other. Accordingly, a stepped surface 13c is present, as illustrated in FIG. 7, at the part of the valve stem 13 where the large-diameter portion 13a and the small-diameter portion 13b are connected to each other.

As illustrated in FIG. 6, the diameter of the large-diameter portion 13a is almost equal to the gap between the two planar portions 16b of the insertion hole 16a. Although the large-diameter portion 13a has a substantially columnar shape, its parts facing the planar portions 16b of the insertion hole 16a are flat. As a result, the gaps between the planar portions 16b of the insertion hole 16a and the large-diameter portion 13a are extremely small as illustrated in FIG. 7. Gaps larger than the gaps between the planar portions 16b of the insertion hole 16a and the large-diameter portion 13a are present, as illustrated in FIG. 6, between the curved surface portions 16c of the insertion hole 16a and the large-diameter portion 13a.

The support plate 17 is fixed to the valve stem 13 by caulking. In other words, in the waste gate valve 10, the support plate 17 is fixed to the valve stem 13 by a tip of the valve stem 13 being pushed in a state where the support plate 17 having an insertion hole with an inner diameter slightly larger than the diameter of the small-diameter portion 13b is assembled to the valve stem 13 in the state illustrated in FIG. 7 and the support plate 17 abuts against the stepped surface 13c. When the support plate 17 is fixed, the disk spring 18 is placed on the arm portion 16 and the disk spring 18 is sandwiched between the arm portion 16 and the support plate 17, such that the valve stem 13 is inserted into an insertion hole in the disk spring 18, before the support plate 17 is assembled to the valve stem 13.

Although a tip surface 13d of the valve stem 13 is a flat surface, an insertion hole 13e is formed at the center of the tip surface 13d. When the support plate 17 is fixed, the tip of the valve stem 13 is pushed to the valve plate 12 side by a punch in a state where a pin disposed at a tip of the punch is inserted into the insertion hole 13e.

As a result, the part of the small-diameter portion 13b that protrudes from the support plate 17 is widened outward and the support plate 17 is fixed to the valve stem 13 as illustrated in FIG. 5. The tip surface 13d of the valve stem 13 pushed by the punch is a flat surface.

In the waste gate valve 10, the insertion hole 16a disposed in the arm portion 16 is a long hole as described above and gaps are formed between the valve stem 13 and the curved surface portions 16c of the insertion hole 16a. Accordingly, the valve body 11 of the waste gate valve 10 can be tilted with respect to the arm portion 16 of the swing arm 14 with an axis parallel to the central axis of the shaft 15 being its rotation center. In other words, the valve body 11 is fixed in a tiltable manner to the arm portion 16.

In the turbocharger 100, the shaft 15 of the waste gate valve 10 extends to the outside of the turbine housing 130 through the turbine housing 130. The shaft 15 is rotatably supported by the turbine housing 130 at the large-diameter portion 13a part. As a result, the swing arm 14 rotates about the shaft 15 and the valve body 11 opens and closes the waste gate port 133.

As illustrated in FIGS. 1 and 2, a plate-shaped waste gate side link arm 25 is fixed to the small-diameter portion 15b of the shaft 15 protruding to the outside of the turbine housing 130. A columnar waste gate side connecting pin 26 is fixed at a position apart from the part of the waste gate side link arm 25 to which the small-diameter portion 15b of the shaft 15 is fixed. The central axes of the shaft 15 and the waste gate side connecting pin 26 are parallel to each other.

As illustrated in FIG. 1, an actuator 20 for driving the waste gate valve 10 is fixed to the compressor housing 110. The actuator 20 has a built-in motor and a rotary shaft 22 is driven by the motor. A plate-shaped actuator side link arm 23 is fixed to the rotary shaft 22. A columnar actuator side connecting pin 24 is fixed at a position apart from the part of the actuator side link arm 23 to which the rotary shaft 22 is fixed. The central axis of the actuator side connecting pin 24 is parallel to the central axis of the rotary shaft 22.

In the turbocharger 100, the actuator side link arm 23 and the waste gate side link arm 25 are connected to each other via a drive rod 30. Insertion holes 32 are disposed in both end portions of the drive rod 30. In the drive rod 30, cylindrical bushes 31 are respectively attached to both end portions of a rod-shaped rod body 33 widened in a disk shape. As a result, in the drive rod 30, the inner peripheral surfaces of the bushes 31 constitute the insertion holes 32.

The actuator side connecting pin 24 and the waste gate side connecting pin 26 have the same dimension. The diameter of the insertion holes 32 is slightly larger than the diameter of the connecting pins 24, 26.

A first end of the drive rod 30 is assembled to the waste gate side link arm 25 such that the waste gate side connecting pin 26 is inserted into the insertion hole 32 and is retained by an E ring 50 fitted into a groove 26a disposed in a tip portion of the waste gate side connecting pin 26.

A second end of the drive rod 30 is assembled to the actuator side link arm 23 such that the actuator side connecting pin 24 is inserted into the insertion hole 32 and is retained by an E ring 50 fitted into a groove 24a disposed in a tip portion of the actuator side connecting pin 24.

Disk springs 40 biasing the drive rod 30 in the extending direction of the central axes of the connecting pins 24, 26 are sandwiched between the first end of the drive rod 30 and the waste gate side link arm 25 and between the second end of the drive rod 30 and the actuator side link arm 23, respectively. The disk spring 40 is a disk spring that has external teeth and an insertion hole 41 is disposed at the center of the disk spring 40. The disk springs 40 are respectively attached to the connecting pins 24, 26 along with the drive rod 30 such that the connecting pins 24, 26 are respectively inserted into the insertion holes 41.

When the rotary shaft 22 is driven by the actuator 20 and the actuator side link arm 23 rotates about the rotary shaft 22, the drive force of the actuator 20 is transmitted to the waste gate side link arm 25 via the drive rod 30. Then, the waste gate side link arm 25 rotates about the shaft 15 and the valve body 11 attached to the swing arm 14 is driven to approach the waste gate port 133 or move away from the waste gate port 133. The waste gate port 133 can be opened and closed by the actuator 20 being driven in this manner.

Figure 8:
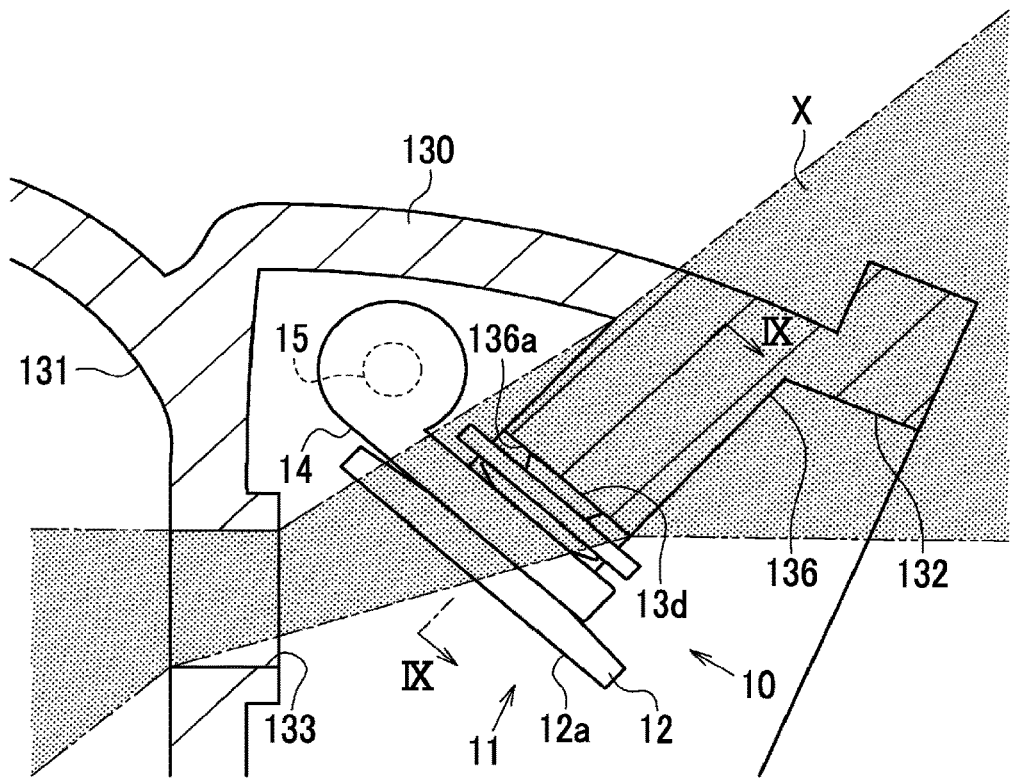
FIG. 8 is a sectional view of the turbine housing in which the vicinity of a stopper is illustrated in an enlarged manner.

The configuration of the stopper 136 will be described below with reference to FIGS. 8 and 9. As illustrated in FIG. 8, the stopper 136 has a square pillar shape and is formed integrally with the turbine housing 130 to protrude into the discharge passage 132 of the turbine housing 130. Integrally casting the stopper 136 in the turbine housing 130 by casting, cutting the stopper 136 in the turbine housing 130 by cutting, or the like can be adopted as a method by which the stopper 136 is formed integrally with the turbine housing 130.

A flat contact surface 136a is disposed in a tip portion of the stopper 136. The contact surface 136a comes into surface contact with the tip surface 13d of the valve stem 13 when the waste gate valve 10 is driven up to the fully open position and the waste gate valve 10 abuts against the stopper 136.

Figure 9:
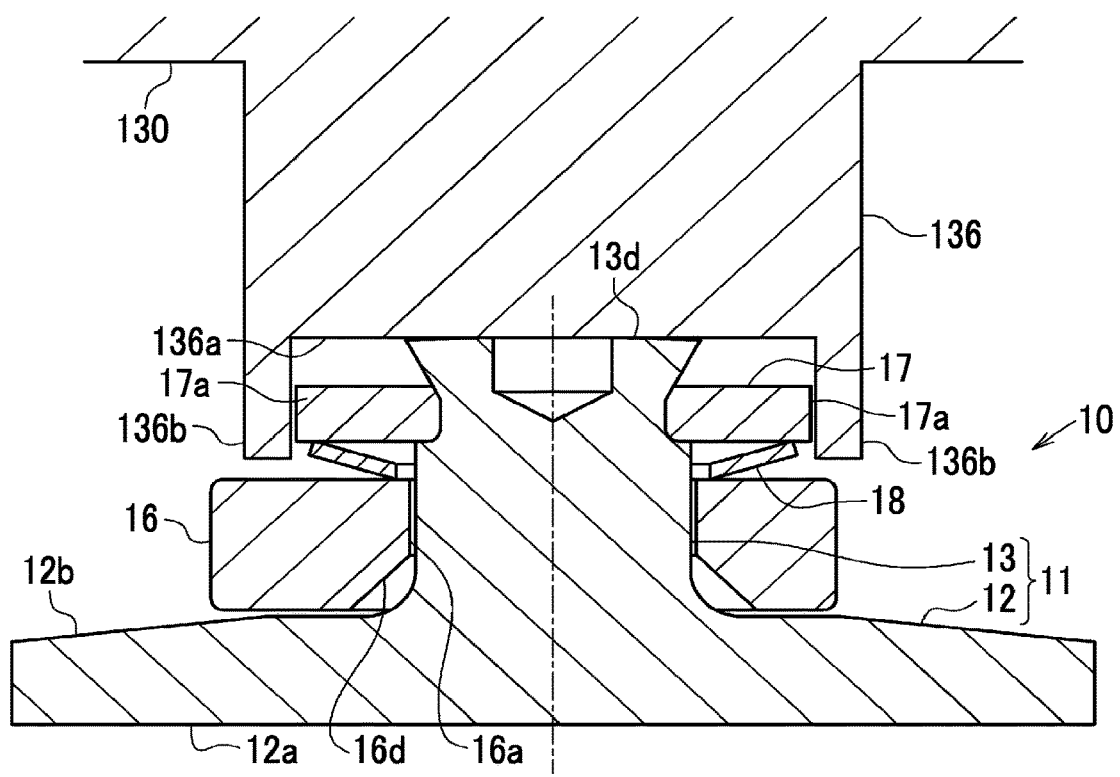
FIG. 9 is a cross-sectional view taken along line arrow IX-IX of FIG. 8.

Two engaging projecting portions 136b protruding more to the valve plate 12 side than the contact surface 136a are disposed in the tip portion of the stopper 136 as illustrated in FIG. 9. Each of the engaging projecting portions 136b has a flat surface engaged with the planar portion 17a of the support plate 17 when the tip surface 13d of the valve stem 13 abuts against the contact surface 136a of the stopper 136 and the valve body 11 abuts against the stopper 136.

Specifically, the two engaging projecting portions 136b are disposed at positions where the support plate 17 is sandwiched in a state where the two engaging projecting portions 136b face the two planar portions 16b of the arm portion 16 via small gaps, and the two engaging projecting portions 136b engage with the two planar portions 17a of the support plate 17 and extend along the planar portions 17a as indicated by the two-dot chain line in FIG. 4.

In the cross section illustrated in FIG. 8, a range X indicated by hatching in FIG. 8 is filled when all of the straight lines capable of reaching the stopper 136 through the waste gate port 133 are drawn. As is apparent from the drawing in FIG. 8, in the turbocharger 100, the straight lines satisfying the above-described condition are sure to be obstructed by the valve plate 12 of the waste gate valve 10 at any opening degree of the waste gate valve 10. In other words, the stopper 136 is disposed at a position at which the straight lines capable of reaching the stopper 136 through the waste gate port 133 pass through the valve plate 12 at any opening degree of the waste gate valve 10.

In other words, in the turbocharger 100, the position and the shape of the stopper 136 are set such that the stopper 136 is hidden in the shadow of the valve plate 12 and cannot be seen regardless of the opening degree of the waste gate valve 10 and the angle at which the discharge passage 132 side is seen through the waste gate port 133 from the scroll passage 131 side.

The action of the turbocharger 100 and effects resulting from the action will be described below.

(1) The valve stem 13 of the valve body 11 abuts against the stopper 136, as illustrated in FIG. 3, once the waste gate valve 10 is rotated until it abuts against the stopper 136 when the waste gate port 133 is open, that is, when the waste gate valve 10 is open. When the valve stem 13 of the valve body 11 abuts against the stopper 136 as described above, a movement of the valve body 11 can be regulated by the stopper 136 and vibration of the valve body 11 can be suppressed compared to a case where the valve body 11 is not in contact with the stopper 136. Accordingly, even when the exhaust gas blown out from the waste gate port 133 collides with the valve plate 12 of the valve body 11, a movement of the valve body 11 can be regulated and the vibration of the valve body 11 that is attributable to a collision of the exhaust gas can be suppressed.

(2) When the valve stem 13 abuts against the stopper 136, the tip surface 13d of the valve stem 13 is in surface contact with the contact surface 136a of the stopper 136 as illustrated in FIG. 9. When the tip surface 13d of the valve stem 13 and the contact surface 136a of the stopper 136 are in surface contact with each other as described above, the valve stem 13 is unlikely to be tilted with respect to the contact surface 136a. Accordingly, vibration causing the valve body 11 to tilt is unlikely to occur.

(3) When the arm portion 16 is allowed to move even closer to the stopper 136 side in a state where the tip surface 13d of the valve stem 13 is in surface contact with the contact surface 136a of the stopper 136, the arm portion 16 moves away from the back surface of the valve plate 12, the disk spring 18 is compressed, and the tip surface 13d is pressed against the contact surface 136a by the biasing force of the disk spring 18. By the tip surface 13d of the valve stem 13 being pressed against the contact surface 136a of the stopper 136 as described above, a force to change the posture of the valve stem 13, that is, a force to cancel the tilting of the valve stem 13 with respect to the contact surface 136a acts on the valve body 11 in a direction to cancel the gap between the tip surface 13d of the valve stem 13 and the contact surface 136a. The force is a force in a direction resisting a force to vibrate the valve body 11, and thus the effect of suppressing vibration of the valve body 11 by using the action of the force can be enhanced by the tip surface 13d of the valve stem 13 being pressed against the contact surface 136a of the stopper 136 when the valve is open.

(4) When the valve body 11 abuts against the stopper 136, the planar portion 17a of the support plate 17 and the engaging projecting portion 136b face each other as illustrated in FIG. 9. Once the valve body 11 rotates by using the valve stem 13 inserted into the insertion hole 16a as a rotary shaft, the planar portion 17a of the support plate 17 and the engaging projecting portion 136b of the stopper 136 are engaged with each other and the rotation of the valve body 11 is regulated.

In other words, in the turbocharger 100, the planar portion 17a disposed in the support plate 17 and the engaging projecting portion 136b disposed in the stopper 136 constitute an engagement structure regulating the rotation of the valve body 11 using the valve stem 13 inserted into the insertion hole 16a as a rotary shaft. As a result, the rotation of the valve body 11 with respect to the arm portion 16 can also be regulated when the valve body 11 abuts against the stopper 136, and thus wear of the valve stem 13 attributable to rotation can be suppressed as well.

(5) The disk spring 18 as an elastic member is sandwiched between the arm portion 16 and the support plate 17, and thus vibration of the valve body 11 can be reduced by the valve body 11 being biased by the restoring force of the disk spring 18. Especially, the vibration of the valve body 11 in a state where the abutting surface 12a of the valve plate 12 is apart from the turbine housing 130 and the valve body 11 does not abut against the stopper 136 can be reduced.

(6) Vibration of the valve body 11 can be reduced in any direction of the perimeter of the valve stem 13 by the valve body 11 being biased by the disk spring 18 over the entire circumference of the perimeter of the valve stem 13.

(7) Vibration of the valve body 11 can be suppressed by the valve body 11 abutting against the stopper 136 and vibration input to the disk spring 18 can be suppressed, and thus the fatigue and weakening of the disk spring 18 can be suppressed.

(8) The stopper 136 is formed integrally with the turbine housing 130, and thus no additional component needs to be prepared to form the stopper 136. Accordingly, an increase in the number of components can be suppressed.

(9) As described with reference to FIG. 8, the stopper 136 is disposed at a position at which the straight lines capable of reaching the stopper 136 through the waste gate port 133 pass through the valve plate 12 at any opening degree of the waste gate valve 10.

When the stopper 136 is disposed at a position with which the exhaust gas blown out from the waste gate port 133 directly collides, disturbance arises in the flow of the exhaust gas due to the collision with the stopper 136. When the stopper 136 is disposed at the above-described position, in contrast, the space between the waste gate port 133 and the stopper 136 is shielded by the valve plate 12 at any opening degree of the waste gate valve 10. In other words, in the above-described case, the exhaust gas blown out from the waste gate port 133 directly collides with the valve plate 12 as in a case where the stopper 136 is not disposed, and the exhaust gas blown out from the waste gate port 133 does not directly collide with the stopper 136 even when the stopper 136 is disposed. Accordingly, disturbance of the flow of the exhaust gas attributable to the disposition of the stopper 136 can be suppressed.

The present disclosure can also be carried out after the embodiment described above is appropriately modified as follows. Although the stopper 136 has a square pillar shape in the example described above, the shape of the stopper 136 can be appropriately changed. In other words, the shape of the stopper 136 is not limited to the square pillar shape. For example, the stopper 136 may have a columnar shape, a polygonal pillar shape, or a pillar shape.

Although the tip surface 13d of the valve stem 13 and the contact surface 136a of the stopper 136 are in surface contact with each other in the example described above, the aspect of contact between the valve body 11 and the stopper 136 does not necessarily have to be surface contact. A movement of the valve body 11 can be regulated by the stopper 136 and vibration of the valve body 11 can be suppressed insofar as the valve body 11 abuts against the stopper 136. In some cases, however, vibration causing the valve plate 12 to tilt is unlikely to be suppressed in a case where the stopper 136 abuts at a position close to the center of the valve plate 12 as in a case where the valve stem 13 abuts against the stopper 136. Accordingly, adopting a configuration in which the tip surface 13d of the valve stem 13 and the contact surface 136a of the stopper 136 are in surface contact with each other as in the embodiment described above is preferable.

In the example described above, the stopper 136 is disposed at a position where the space between the waste gate port 133 and the stopper 136 is shielded by the valve plate 12 at any opening degree. However, a part not shielded by the valve plate 12 may be present in the stopper 136 as well. Still, every part of the stopper 136 being shielded by the valve plate 12 as in the embodiment described above is preferable in order to suppress the disturbance of the flow of the exhaust gas that is attributable to the disposition of the stopper 136.

The stopper may not abut against the tip of the valve stem 13. Even in a case where the stopper abuts against a part of the valve stem 13 other than its tip and a part of the valve body 11 other than the valve stem 13, vibration of the valve body 11 can be suppressed insofar as a movement of the valve body 11 can be regulated.

Figure 10:
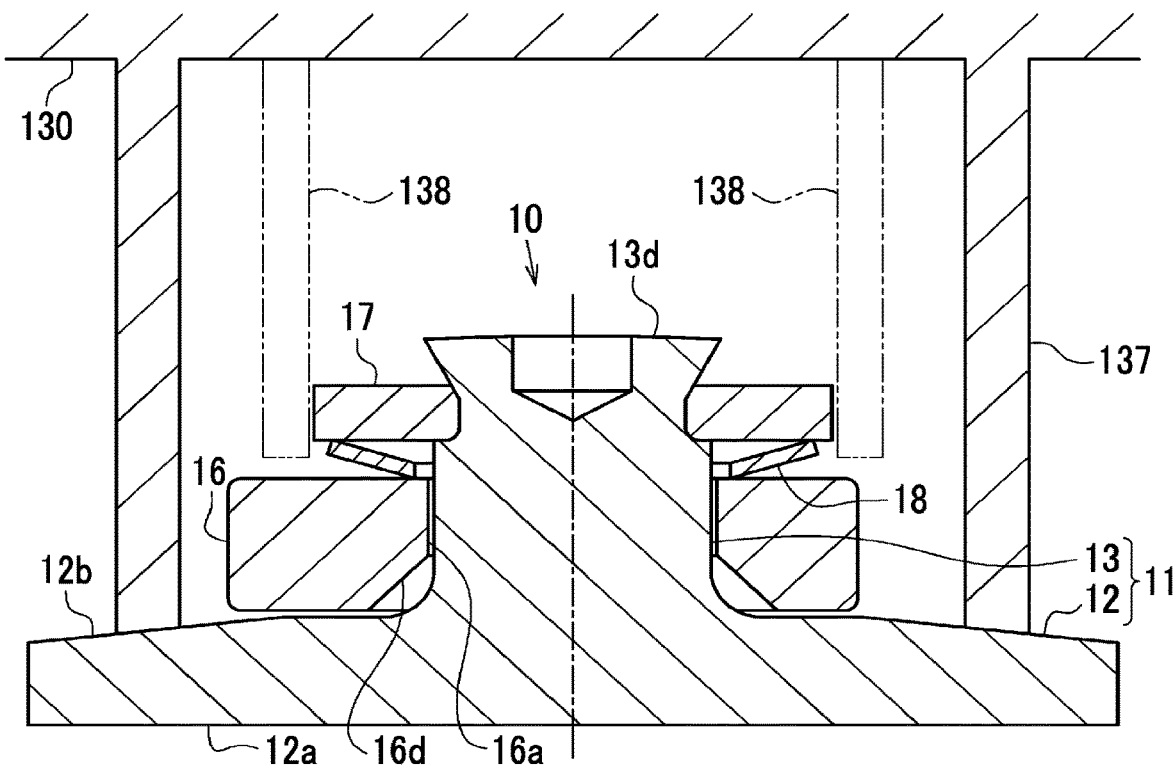
FIG. 10 is a sectional view of a stopper and a waste gate valve of a turbocharger according to a modification example.

For example, a stopper 137 protruding into the turbine housing 130 and abutting against the back surface 12b of the valve plate 12 of the valve body 11 may be disposed as illustrated in FIG. 10. The stopper 137 is formed in a tubular shape. In a case where the stopper 137 is disposed, a tip of the stopper 137 abuts against the back surface 12b of the valve plate 12 when the waste gate valve 10 is fully open. When the valve plate 12 of the valve body 11 abuts against the stopper 137 as described above, a movement of the valve body 11 can be regulated by the stopper 137 and vibration of the valve body 11 can be suppressed compared to a case where the valve body 11 is not in contact with the stopper 137. Accordingly, even when the exhaust gas blown out from the waste gate port 133 collides with the valve plate 12 of the valve body 11, a movement of the valve body 11 can be regulated and the vibration of the valve body 11 that is attributable to a collision of the exhaust gas can be suppressed as in the embodiment described above.

Rotation of the valve body 11 can be regulated insofar as the valve body 11 and the support plate 17 and a part of the turbine housing 130 and the arm portion 16 are engaged with each other when the valve body 11 rotates by using the valve stem 13 as a rotary shaft. Accordingly, the engagement structure is not limited to the structure according to the embodiment described above. For example, the engaging projecting portion 136*b* may not be disposed solely on one side although an example in which the two engaging projecting portions 136*b* are disposed to sandwich the support plate 17 has been described in the above embodiment. Even in the above-described case, rotation of the valve body 11 can be regulated by the engagement between the engaging projecting portion 136*b* and the planar portion 17*a*.

Engaging portions 138 extending from the turbine housing 130 to the same positions as the engaging projecting portions 136*b* may also be disposed with respect to the configuration illustrated in FIG. 10 as indicated by the two-dot chain lines. In the above-described case, the planar portion 17*a* and the engaging portion 138 constitute an engagement structure.

The engagement structure does not necessarily have to be formed by the stopper 136 and the valve body 11. The engagement structure may not be formed by the stopper 136 and the valve body 11 when the support structure for the valve body 11 in the waste gate valve 10 itself is a structure in which the valve body 11 is unlikely to rotate as in the case of disposition of an engagement structure suppressing rotation in the valve stem 13 and the arm portion 16.

The engagement structure for suppressing the rotation of the valve body 11 may not be disposed as well. The effect of suppressing the vibration of the valve body 11 can still be achieved even when the rotation of the valve body 11 cannot be suppressed. Although an example in which the disk spring 18 is disposed between the arm portion 16 and the support plate 17 and the disk spring 18 is not disposed between the valve plate 12 and the arm portion 16 has been described in the above embodiment, disk springs may also be disposed between the valve plate 12 and the arm portion 16 and between the arm portion 16 and the support plate 17 alike.

Figure 11:
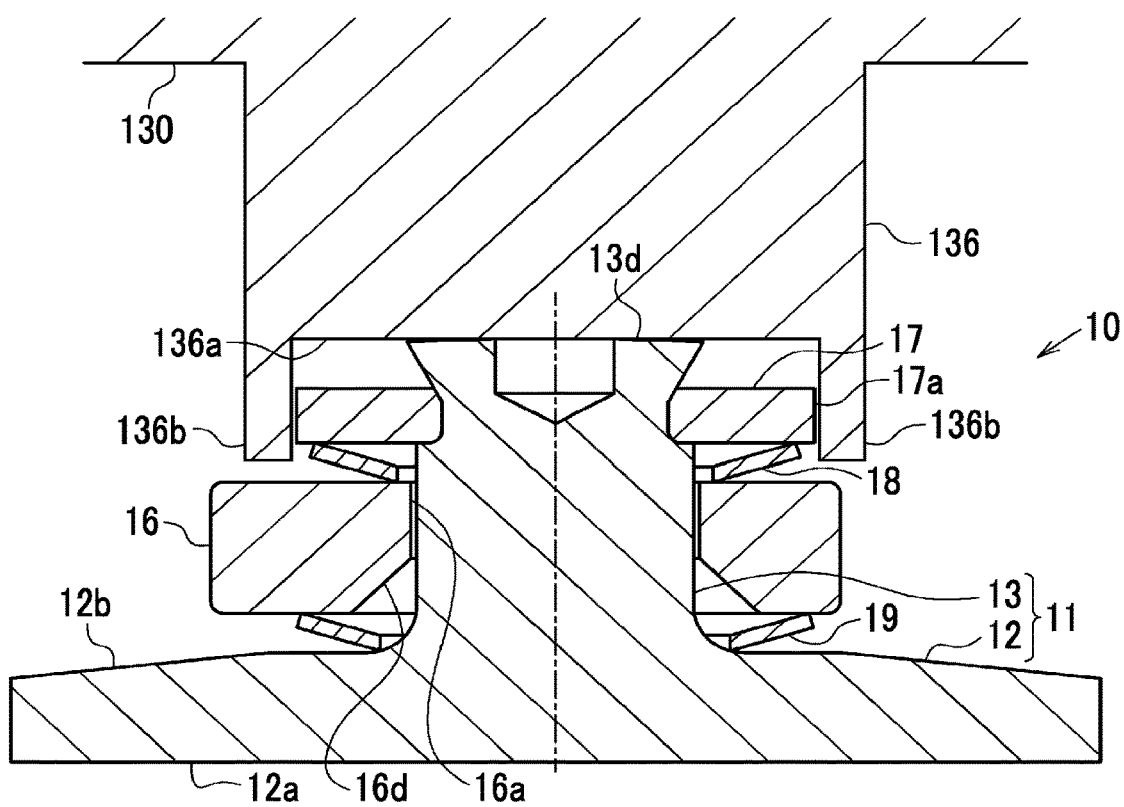
FIG. 11 is a sectional view of a stopper and a waste gate valve of a turbocharger according to a modification example.

For example, a configuration may also be adopted in which a disk spring 19 is disposed between the arm portion 16 and the back surface 12*b* of the valve plate 12 as illustrated in FIG. 11. In the above-described case, the disk spring 19 is restored because a load applied to the disk spring 19 is extremely small while the disk spring 18 is compressed by the valve body 11 being pressed against the stopper 136. Accordingly, vibration of the valve body 11 can be suppressed by the valve body 11 being pressed against the stopper 136 and weakening of the disk spring 19 can also be suppressed by the load acting on the disk spring 19 being reduced.

The disk spring 19 may be disposed alone without the disk spring 18, too. In the above-described case, the arm portion 16 is biased by the disk spring 19 and abuts against the support plate 17 at all times. In a case where the valve body 11 abuts against the stopper, the valve body 11 can be pressed against the stopper 136 and vibration can be suppressed by the arm portion 16 being pressed against the support plate 17.

The elastic member disposed between the valve plate 12 and the arm portion 16 and between the arm portion 16 and the support plate 17 may be an elastic member other than the disk spring. For example, a coil spring may be sandwiched between the valve plate 12 and the arm portion 16 and between the arm portion 16 and the support plate 17. Vibration of the valve body can be reduced by the valve body 11 being biased by the restoring force of the elastic member insofar as the elastic member is sandwiched between the valve plate 12 and the arm portion 16 and between the arm portion 16 and the support plate 17.

A configuration can also be adopted in which no elastic member is disposed between the valve plate 12 and the arm portion 16 and between the arm portion 16 and the support plate 17. In a case where no elastic member is disposed between the valve plate 12 and the arm portion 16 and between the arm portion 16 and the support plate 17, the valve body 11 is configured to freely tilt with respect to the arm portion 16 when the valve body 11 does not abut against the turbine housing 130. Even in this configuration, vibration of the valve body 11 can be suppressed insofar as the valve body 11 is pressed against the stopper. In a configuration omitting the disk spring 18 from the configuration of the embodiment described above, for example, the valve body 11 can be pressed against the stopper 136 and vibration of the valve body 11 can be suppressed by the arm portion 16 being pressed against the support plate 17 in a case where the valve body 11 abuts against the stopper 136.

The stopper does not necessarily have to be integrated with the turbine housing 130. In an alternative configuration, the stopper may be a component separate from the turbine housing 130 and the stopper may be attached to the inside of the turbine housing 130 by fastening or the like.

A mechanism for opening and closing the waste gate valve 10 is not limited to the configuration described in the above embodiment. For example, the actuator is not particularly limited insofar as the actuator is capable of driving the drive rod 30. For example, the actuator may also be a diaphragm-type actuator driving the drive rod 30 by using air pressure or a hydraulic cylinder-type actuator driving the drive rod 30 by using hydraulic pressure.

What is claimed is:

1. A turbocharger comprising:
a turbine wheel;
a turbine housing including a waste gate port allowing exhaust gas to flow by bypassing the turbine wheel;
a waste gate valve configured to open and close the waste gate port, the waste gate valve including a valve body, a swing arm, and a support plate, the valve body including a valve plate and a valve stem, the valve plate being configured to close the waste gate port by abutting against the turbine housing, the valve stem being disposed on a back surface of the valve plate on a side opposite to an abutting surface of the valve plate configured to close the waste gate port, the swing arm including a shaft and an arm portion, the shaft being supported to rotate with respect to the turbine housing, the arm portion being formed with an insertion hole into which the valve stem is inserted, the support plate being fixed to a part of the valve stem protruding from the insertion hole, and the arm portion being sandwiched between the support plate and the valve plate and configured such that the valve body tilts with respect to the arm portion; and
a stopper disposed in the turbine housing, the stopper being configured to abut against the valve body when the abutting surface of the valve plate is apart from the turbine housing and the waste gate port is in an open state,
wherein the stopper is fixed relative to the turbine housing,
wherein a part of a peripheral edge of the support plate is a linearly extending planar portion,
wherein the stopper includes an engaging projecting portion engaged with the planar portion when the valve body abuts against the stopper, and
wherein the planar portion disposed in the support plate and the engaging projecting portion disposed in the stopper constitute engaging portions, the engaging portions are configured to regulate rotation of the valve body using the valve stem inserted into the insertion hole as a rotary shaft.

2. The turbocharger according to claim 1, wherein:
a tip of the part of the valve stem of the valve body protruding from the insertion hole is a flat surface; and
the stopper has a flat contact surface in surface contact with the tip of the valve stem of the valve body.

3. The turbocharger according to claim 2, wherein a free end of the engaging projecting portion is closer to the valve plate than the valve plate is to the flat contact surface when the valve body abuts the stopper.

4. The turbocharger according to claim 1, wherein an elastic member is sandwiched in at least one of between the valve plate and the arm portion and between the arm portion and the support plate.

5. The turbocharger according to claim 4, wherein the elastic member is a disk spring sandwiched between the support plate and the valve plate along with the arm portion with the valve stem inserted into the disk spring.

6. The turbocharger according to claim 1, wherein the stopper is integrated with the turbine housing.

7. The turbocharger according to claim 1, wherein the stopper is disposed such that a straight line passing through the waste gate port and the stopper passes through the valve plate at any opening degree of the waste gate valve.

* * * * *